United States Patent [19]
Ryu et al.

[11] 3,734,830
[45] May 22, 1973

[54] CONTINUOUS PROCESS FOR PREPARING DELTA-DEHYDROGENASE

[75] Inventors: Dewey Y. Ryu, East Brunswick; Bong Kuk Lee, Old Bridge; Richard W. Thoma, Somerville, all of N.J.

[73] Assignee: E. R. Squibb & Sons, Inc., New York, N.Y.

[22] Filed: Feb. 4, 1971

[21] Appl. No.: 112,827

[52] U.S. Cl. .................. 195/65, 195/51 E, 195/115
[51] Int. Cl. ............................................. C12d 13/10
[58] Field of Search .................. 195/51 E, 65, 66, 195/115

[56] References Cited

UNITED STATES PATENTS

| | | | |
|---|---|---|---|
| 3,585,110 | 6/1971 | Ryu et al. | 195/51 E |
| 2,902,410 | 9/1959 | Weintraub et al. | 195/51 E |
| 3,360,439 | 12/1967 | Erickson et al. | 195/51 E |

*Primary Examiner*—Lionel M. Shapiro
*Attorney*—Lawrence S. Levinson, Merle J. Smith and Donald J. Perrella

[57] ABSTRACT

A continuous process is provided for preparing inducible enzymes wherein cells of a microorganism are grown in a first stage under substantially optimal conditions for growth and enzyme is produced in a second stage in the presence of an inducer under conditions substantially optimal for enzyme production. This process is especially applicable to the production of Arthrobacter simplex cells rich in 3-ketosteroid-$\Delta'$-dehydrogenase activity.

7 Claims, No Drawings

CONTINUOUS PROCESS FOR PREPARING DELTA-DEHYDROGENASE

The present invention relates to a continuous process for the preparation of inducible enzymes, such as 3-ketosteroid-$\Delta'$-dehydrogenase, hereinafter referred to as $\Delta'$-dehydrogenase, by producing cells of the appropriate microorganism in a first stage and thereafter in a separate second stage, producing enzymes in the cells, in the presence of an inducer and in the absence of co-repressor. By this process, greater control over process conditions is maintained and production of enzyme is increased over prior art batch processes, while operating expenses are reduced.

Inducible enzymes, such as $\Delta'$-dehydrogenase, almost universally are produced by inoculating a suitable nutrient material, usually comprising a nitrogenous substance and a source of carbon and energy, with cells of an appropriate microorganism, for example Arthrobacter simplex, and allowing the cells to grow in the presence of an adequate supply of oxygen. An inducer, such as progesterone is added, the cells are allowed to mature and production of $\Delta'$-dehydrogenase is induced. The cells are harvested, for example from 48 to 72 hours after inoculation, washed and dried and enzyme is subsequently recovered.

This conventional process is a one stage batch procedure. Control of the specific mechanisms involved in growing the cells and inducing enzyme production can be difficult. Furthermore, the presence of co-repressor tends to reduce and inhibit enzyme production.

It has now been found that increased $\Delta'$-dehydrogenase productivity, that is the amount of enzyme produced per unit fermentor volume per unit time, can be increased, and control of cell growth and enzyme production enhanced, while reducing overall production cost, including cost of equipment, time of operation, medium and inducer, by carrying out the production of $\Delta'$-dehydrogenase as a two-stage continuous operation wherein different sets of optimal conditions are employed in each stage.

Thus, in accordance with the invention, a continuous process is provided for the production of $\Delta'$-dehydrogenase, which comprises, in a first stage, inoculating a nutrient medium comprising from about 1 to about 2% w/v of a nitrogenous substance, from about 0.1 to about 0.5% w/v of a carbon source, a mineral source such as from about 0.05 to about 0.15 percent of a phosphate, less than about 0.01 percent of an antifoaming agent, and water, with cells of an appropriate microorganism as outlined below, maintaining temperature of the inoculum within the range of from about 23°C to about 27°C, pH within the range of from about 5.5 to about 8.0, aeration rate within the range of from about 0.5 to about 1.0 vol. of air/vol. broth/min., dilution rate within the range of from about 0.1 to about 0.18 hour$^{-1}$, while agitating the fermentation beer at from about 400 to about 600 rpm, for a mean residence time of from about 10 to about 5.5 hours, thereby growing cells of the microorganism at or near maximum productivity; transferring broth from the first stage to a second stage; adding inducer to the broth while maintaining temperature of the broth within the range of from about 24°C to about 26°C, pH within the range of from about 7.0 to about 7.7 depending upon the microorganism used, aeration rate within the range of from about 0.2 to about 0.5 vol of air/vol. broth/min., dilution rate of within the range of from about 0.025 to about 0.045 hour$^{-1}$, while agitating the broth at from about 250 to about 450 rpm, for a mean residence time of within the range of about 22 to about 40 hours, thereby preventing repression of the enzyme and catabolite repression and producing $\Delta'$-dehydrogenase.

The inoculum for the fermentation may be prepared by cultivating the given microorganism on media best adapted for growth of that particular microorganism. An agar slant culture may be used to provide surface growth to inoculate a shaken flask for further propagation of the microorganism according to conventional techniques. Growth from the first or later member of a series of shaken flasks may then be used in the culture fermentation.

In general, the conditions of culturing the microorganisms for the purpose of this invention (first stage) are the same as those of culturing microorganisms for the production of antibiotics or vitamins. Thus, the microorganism is grown in contact with (in or on) a suitable nutrient medium in the presence of an adequate supply of oxygen (air). A suitable nutrient medium essentially comprises a source of nitrogenous factors and an assimilable source of carbon and energy, inorganic salts, and growth factors. The source of carbon and energy may be a carbohydrate such as sucrose, fructose, mannose, lactose, pentoses, molasses, glucose, maltose, xylose, starch or dextrin. The source of nitrogenous factors may be organic (e.g., casein, egg albumin, polypeptides, aminoacids, acid amides, soybean meal, corn steep liquor, meat extract, distiller's solubles, peptones and/or yeast extract) or synthetic (i.e., composed of simple, synthesizable organic and inorganic compounds such as ammonium salts, alkali nitrates, amino acids or urea).

Mineral requirements of fermentation are usually supplied in the crude materials which are often used as sources of carbon and nitrogen or occur in the water available for use in the process. However, it is usually advisable to supplement the minerals normally present with added amounts to obtain an optimal growth.

As mineral constituents the media can contain, naturally present or added, available aluminum, calcium, chromium, cobalt, copper, gallium, iron, magnesium, molybdenum, potassium, scandium, uranium, and vanadium. Sulfur can be provided by sulfates, alkyl sulfonates, sulfoxylates, sulfamates, sulfinates, free sulfur, hyposulfite, persulfate, thiosulfate, methionine, cystine, cystein, thiamin, or biotin. Phosphorus, preferably pentavalent, suitably in a concentration at or about 0.05 to 0.15 percent can be present, suitably as ortho-, meta-, or pyrophosphates, salts or esters, phytin, phytic acid, phytates, glycerophosphates, sodium nucleinate, and/or corn steep liquor, casein, or lecithin. Boron, iodine and selenium in traces may be advantageous. Desirably boron, in the form of boric acid or sodium borate can be present or added especially after germination and early growth of the fungus.

Other accessory growth factors, vitamins, auxins and growth stimulants can be provided as needed or desired.

While solid or liquid media can be utilized, a liquid medium is preferred as it favors mycelial growth.

To guard against contamination the fermentation medium can contain added antiseptic or antibiotic agents such as benzoates, sulfites, penicillin, or tetracycline in the second stage.

Suspending materials or mycelial carriers such as filter earths, filter aids, finely divided cellulose, wood chips, bentonite, calcium carbonate, magnesium carbonate, or other suspendable solid matter, substances such as methyl cellulose, carboxymethyl cellulose, alginates or polyvinyl alcohol can be added to facilitate fermentation, aeration and filtration.

During the fermentation process, it may be found desirable to add an antifoaming agent. In such cases, commercially-available products may be used. These usually contain agents such as silicones, glyceride oils, and the like. These compounds are added from time to time and in the amounts needed.

Microorganisms which can be employed in preparing the enzyme $\Delta'$-dehydrogenase in accordance with the process of the invention include those which effect the introduction of a double bond into the 1,2-position of the A-ring of a steroid (1-dehydrogenators) such as those of the genus Arthrobacter, e.g., *A. simplex, globiformis, pascens, oxydans, aurescens, ureafaciens, tumescens, citreus,* and *terregens*. Other suitable microorganisms include members of the genera: Corynebacterium (e.g., *C. simplex*), Nocardia (e.g., *N. aurantia* and *N. asteroides*), Bacterium (e.g., *B. cyclooxydans*), Mycobacterium (e.g., *M. rhodochrous*), Bacillus (e.g., *B. sphaericus*), Septomyxa (e.g., *S. affinis*), Didymella (e.g., *D. lycopersici*), Calonectria (e.g., *C. decora*), Fusarium (e.g., *F. solani*), Cylindrocarpon (e.g., *C. radicicola*), Pseudomonas (e.g., *P. testosteroni*), Streptomyces (e.g., *S. lavendulae*), and also selected species of the genera: Protaminobacter, Alcaligenes, Alternaria, Ophiobolus and Pycinodithis.

In the second stage, in order to induce the formation of the $\Delta'$-dehydrogenase enzyme, a 1,2-saturated steroid (inducer), such as progesterone or testosterone, is added to the nutrient medium containing the cells. The steroid is present in a sufficient quantity to favor optimum formation of the enzyme and preferably is present in a concentration of at least 0.01% (w./v.) and up to about 0.04% (w./v.) of the nutrient medium.

While any form of aerobic incubation is satisfactory for the growth of the selected microorganism and production of the enzyme, the efficiency of the process is related to aeration and agitation. Therefore, aeration is usually controlled, as by agitation and/or blowing air through the fermentation medium. Aeration can be effected by surface culture or under submerged fermentation conditions. Aerobic conditions include not only the use of air to introduce oxygen, but also other sources or mixtures containing oxygen in free or liberatable form. Aeration is suitably modified by using super-atmospheric pressures, for example, 30 pounds per square inch absolute. Oxygen uptake can be facilitated by the presence of various agents such as fluorocarbon, hydrocarbon, ascorbic acid, glutamic acid, citric acid, lactic acid, tyrosine, or tryptophane. The pH may be controlled by addition of alkali or phosphoric acid. The addition of excess calcium carbonate to maintain a solid calcium carbonate residue has been found desirable.

The product (enzyme-rich cells) is separated from the fermentation medium by the conventional means of filtration or centrifugation, and is dried by acetone extraction followed by oven-drying, or is dried by freeze-drying (lyophilization).

The following Examples further illustrate the invention.

EXAMPLE 1

*Arthrobacter simplex*. ATCC 6946 is grown for 2 days at 25° C. on an agar slant of the following composition:

| Medium A | Grams |
|---|---|
| Beef Extract | 1.5 |
| Yeast Extract | 3.0 |
| Peptone | 6.0 |
| Glucose | 1.0 |
| Distilled water to 1 liter | |
| Autoclaved for 30 minutes at 121°C. | |

One ml. portions of a suspension obtained by washing the surface of one slant with 5 ml. of sterile water or one loopful (0.0025 ml.) of organisms from the slant are used to inoculate 50 ml. portions of the following medium contained in cotton-plugged 250 ml. Erlenmeyer flasks:

| Medium B | Grams |
|---|---|
| Peptone | 5.0 |
| Tryptone | 5.0 |
| Yeast Extract | 5.0 |
| Glucose | 20.0 |
| $CaCO_3$ | 2.5 |
| Distilled water to 1 liter | |
| Autoclaved for 30 minutes at 121°C. | |

The inoculated flasks are incubated at 25°C. with rotary shaking in a radius of 2 inches at 280 revolutions per minute. After 24 hours, 0.1% (vol./vol.) culture broth is used to inoculate 50 ml. portions of the following medium contained in cotton-plugged 250 ml. Erlemeyer flasks (first stage of invention):

| Medium C | Grams/liter |
|---|---|
| Sheffield-NZ-Amine-A | 2 |
| $KH_2PO_4$ | 0.1 |
| Ucon (anti-foaming agent) | 0.01 |
| Tap water to 1 liter | |
| Autoclaved for 20 minutes at 121°C. | |

These first stage inoculum flasks are continuously incubated at 24°–26°C., at a pH of 6.9–7.1, with rotary shaking in a radius of 2 inches at 500 rpm at an aeration rate of 0.5 vol air/vol broth/min. at a dilution rate of about 0.1–0.18 hour$^{-1}$.

After allowing about 5.5–10 hours mean residence time, broth is continuously transferred to a second stage, 12.5 liter fermentor. 250 mg/l of progesterone concentration is maintained in the second stage by continuous feeding. The progesterone is dissolved in dimethylformamide at 30 gm/l concentration. The fermentation conditions for the second stage fermentor are as follows:

| | |
|---|---|
| Temperature range: | 24°–36°C |
| pH | 7.2–7.6 |
| Agitation | 250–450 RPM |
| Aeration | 0.2–0.5 vol air/vol broth/min |
| Dilution rate | 0.025–0.045 hr.$^{-1}$ |

After a mean residence time of 22–40 hours, cells rich in $\Delta'$-dehydrogenase activity are continuously removed by centrifugation and recovered, in wet or dry form, the latter if conventional solvent-drying or lyophilization techniques are used.

EXAMPLE 2

Employing the procedure of Example 1, but substituting the following nutrient medium C in the first stage:

| Medium C | Grams/liter |
|---|---|
| EHC Amber | 2 |
| Glucose | 0.5 |
| KH$_2$PO$_4$ | 0.1 |
| Ucon | 0.01 |
| Distilled water to 1 liter | |

$\Delta'$-dehydrogenase is produced in the second stage.

EXAMPLE 3

Employing the procedure of Example 1, but substituting the following nutrient medium C in the first stage:

| Medium C | Grams/liter |
|---|---|
| Yeastamin (Vice Products Corporation, Chicago) | 1.0 |
| Glucose | 0.5 |
| KH$_2$PO$_4$ | 0.1 |
| Ucon | 0.01 |
| Distilled water to 1 liter | |

$\Delta'$-dehydrogenase is produced in the second stage.

EXAMPLES 4 TO 8

Employing the procedure of Example 1, the following microorganisms can be substituted for *Arthrobacter simplex*, to produce $\Delta'$-dehydrogenase.

| Example No. | Microorganism |
|---|---|
| 4 | *Corynebacterium simplex* |
| 5 | *Septomyxa affinis* |
| 6 | *Mycobacterium rhodochrous* |
| 7 | *Bacillus sphaericus* |
| 8 | *Bacterium cyclooxydans* |

What is claimed is:

1. A continuous process for the production of 3-ketosteroid-$\Delta'$-dehydrogenase, which comprises, in a first stage, inoculating a nutrient medium comprising from about 1 to about 2% w/v of a nitrogenous substance, from about 0.1 to about 0.5% w/v of a carbon source, a mineral source, less than about 0.01% of an anti-foaming agent, and water, with cells of a microorganism capable of producing 3-ketosteroid-$\Delta'$-dehydrogenase, maintaining temperature of the inoculum within the range of from about 23°C to about 27°C, pH within the range of from about 5.5 to about 8.0, aeration rate within the range of from about 0.5 to about 1.0 vol. of air/vol. broth/min., dilution rate within the range of from about 0.1 to about 0.18 hour$^{-1}$, while agitating the fermentation beer at from about 400 to about 600 rpm, for a mean residence time of from about 10 to about 5.5 hours, thereby growing cells of the microorganism at or near maximum cell productivity; continuously transferring broth from the first stage to a second stage; continuously adding inducer to the broth in sufficient quantity to favor optimum formation of the enzyme 3-ketosteroid-$\Delta'$-dehydrogenase while maintaining temperature of the broth within the range of from about 24°C to about 26°C, pH within the range of from about 7.0 to about 7.7 depending upon the microorganism used, aeration rate within the range of from about 0.2 to about 0.5 vol of air/vol broth/min., dilution rate of within the range of from about 0.025 to about 0.045 hour$^{-1}$, while agitating the broth at from about 250 to about 450 rpm, for a mean residence time within the range of from about 22 to about 40 hours, thereby preventing repression of the enzyme and catabolite repression and producing cells rich in $\Delta'$-dehydrogenase activity.

2. A process in accordance with claim 1 wherein the microorganism employed is selected from the group consisting of those of the genus Arthrobacter, Corynebacterium, Bacterium, Mycobacterium, Bacillus, Septomyxa, Didymella, Calonectria, Fusarium, Cylindrocarpon, Pseudomonas and Streptomyces.

3. A process in accordance with claim 2 wherein the microorganism employed is *Arthrobacter simplex*.

4. A process in accordance with claim 2 wherein the microorganism employed is *Septomyxa affinis*.

5. A process in accordance with claim 2 wherein the microorganism employed is *Mycobacterium rhodochrous*.

6. A process in accordance with claim 2 wherein the microorganism employed is *Bacillus sphaericus*.

7. A process in accordance with claim 2 wherein the microorganism employed is *Bacterium cyclooxydans*.

* * * * *